Sept. 19, 1950 W. H. HAGENBUCH 2,522,574
FLOW MEASURING DEVICE
Filed May 1, 1944 2 Sheets-Sheet 1

Sept. 19, 1950     W. H. HAGENBUCH     2,522,574
FLOW MEASURING DEVICE

Filed May 1, 1944     2 Sheets-Sheet 2

INVENTOR.
William H. Hagenbuch
BY Henry L. Dyling
His Attorney

Patented Sept. 19, 1950

2,522,574

UNITED STATES PATENT OFFICE 2,522,574

FLOW MEASURING DEVICE

William H. Hagenbuch, Middletown, Ind.

Application May 1, 1944, Serial No. 533,594

2 Claims. (Cl. 175—41.5)

This invention relates to a device for measuring and more particularly to a device for precision measurement of irregularly pulsating flows of currents.

An object of this invention is to provide a fundamental combination of elements which will constitute an instrument adapted for precise measurement of irregular flows in terms of averages.

Another object of this invention is to use low inertia elements, so that there is no integrating effect prior to an integrating stage.

Other objects and advantages reside in the construction of parts, the combination thereof and the mode of operation, as will become more apparent from the following description.

Referring to the drawings, Figure 1 discloses a schematic diagram of the steps used in measuring pulsating currents.

Figure 1:
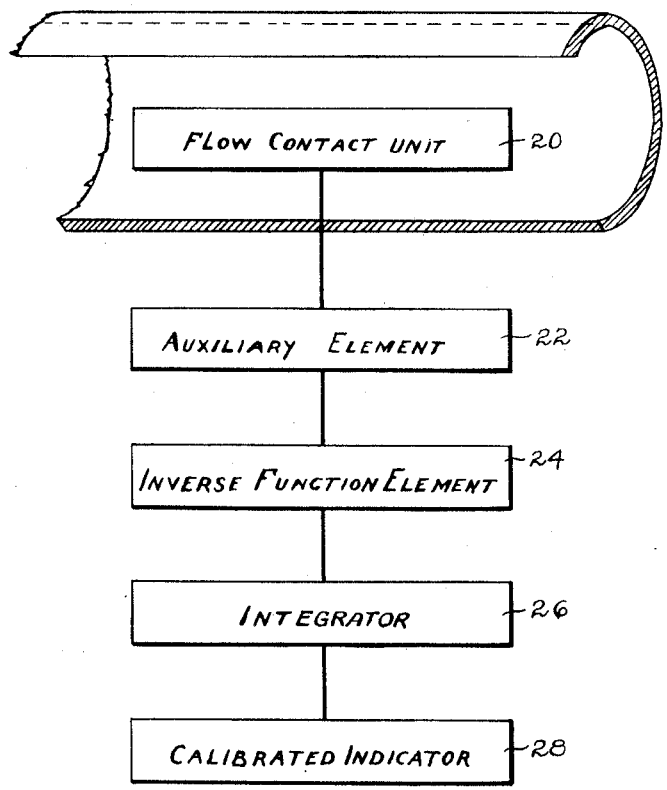
Figure 2:
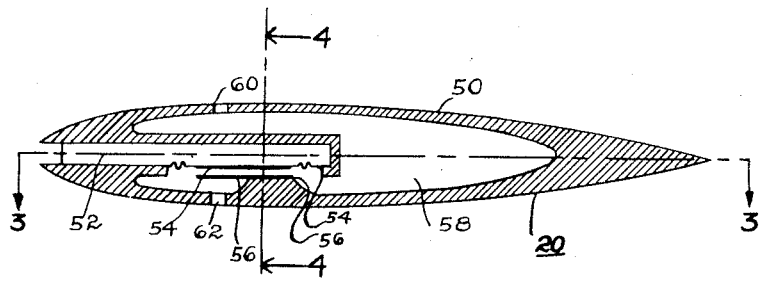
Figure 2 is a cross sectional view of a flow contact unit, taken substantially on the line 2—2 of Figure 3.
Figure 3:
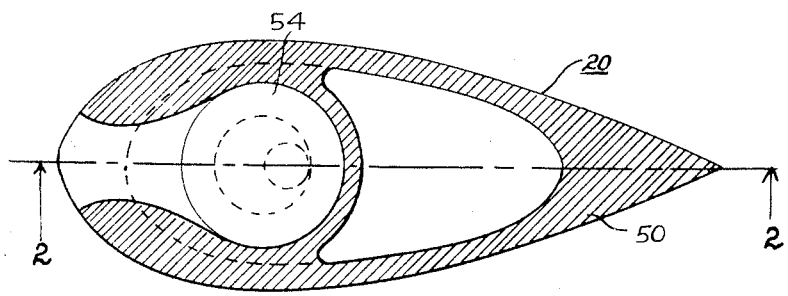
Figure 3 is a cross sectional view of the flow contact unit, taken substantially on the line 3—3 of Figure 2.
Figure 4:
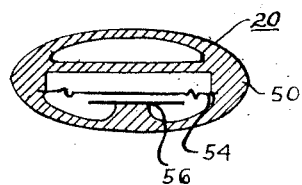
Figure 4 is a transverse cross sectional view taken substantially on the line 4—4 of Figure 2.

Irregularly pulsating flows are unavoidable in many large industrial pumping operations. The present flow meters fail to accurately and precisely measure large flows of this type. That being the case, it is necessary to resort to skilled and experienced operators in order to obtain the proper control of fluid flows. This proves expensive and skilled operators may be erratic and inefficient.

This may best be illustrated by referring to a specific problem. The metering of blast furnace air, which is supplied from a plurality of compressors running at different speeds, pumping the air at the rate of several thousand tons of air per day, certainly presents a problem in accurate measurement. At present, the performance of the furnace is the only indication of the amount of air blast and by this indication the air blast is regulated. This results in low efficiency operation between the time when the air blast falls off and the time when correction brings the furnace back to normal operation. This lack of accurate information as to the amount of the air blast has hampered the development of other aids to the operation of blast furnaces, such as the moisture condition blast. In the blast furnace example, it is estimated that the air flow fluctuation dropped to half the average flow and that the frequencies of pulsation may vary from .2 to 1000 cycles per second. Under these conditions it has been experimentally determined that a pitot-manometer, even with elaborate calibrations, gives average flow reading precision to only plus or minus 7%. This great error is caused by the non-linear (root-mean-square) characteristics of the combined elements of the pitot and the manometer. With this irregularly pulsating flow a displacement type of meter should give highly accurate readings. However, it's use is obviously impractical for measuring several thousand tons per day because of the cost of construction. In the same manner, other flow meters have either practical or theoretical limitations which make such flow meters unsuitable for measuring large irregularly pulsating flows.

If any irregularly pulsating flow is represented by a function of time:

$$G = f(t)$$

where:

$G$ = instantaneous flow rate
$f$ = an irregular unpredictable function
$t$ = time then the average flow rate over any period from $T_1$ to $T_2$ is given by $$G_{average} = \frac{1}{T_2 - T_1} \int_{T_1}^{T_2} G \, dt$$

where:

$T_1$ = time at start of period
$T_2$ = time at end of period

Now consider the elements required if this integration is to be performed by an automatic mechanism:

First, some responsive unit must be brought into contact with the flowing fluid. For example, we may consider a Pitot tube and a static pressure tube. Even though the relation between the flow rate and the pressure difference involved in this case is well known (by Bernoulli's theorem: $\Delta P \cong G^2$), it is desirable to use a more general representation:

$$\Delta P = f_1(G)$$

where $\Delta P$ = potential derived from the flowing fluid.

Second, this potential actuates another device in which a pressure potential may be transformed into an electrical potential. These two devices in combination shall be called the "flow contact element", and their operation is described mathematically as:

$$e_1 = f_2(\Delta P)$$

or $$e_1 = f_2(f_1(G))$$

where: $e_1$ = output of flow contact element.

Third, an auxiliary element may be actuated by this potential $e_1$, and may be used to transmit or amplify the potential. In any case its output may be represented as:

$$e_2 = f_3(e_1)$$

or $$e_2 = f_3(f_2(f_1(G)))$$

where: $e_2$ = output of auxiliary element.

But since $e_2$ is not a linear function of G, we cannot integrate $e_2$ to determine G average directly. Moreover, in the case of an irregularly pulsating flow, the integral of $e_2$ cannot be converted into G average inasmuch as G is an irregular or unpredictable function of $t$.

Fourth, added in the series is another element which has a characteristic function and inverse of those elements which preceded it. This element shall be called the "inverse function element." Its output may also be described in the same way.

$$e_3 = f_4(e_2)$$

or $$e_3 = f_4(f_3(f_2 f_1(G)))$$

where: $e_3$ = output of inverse function element

But when this element is properly designed, the above equation may be simplified to the form of a substantially linear equation, providing, of course, that $f_1$, $f_2$, $f_3$ and $f_4$ are not functions of time.

$$e_3 = mG + b$$

where:

$m$ = constant
$b$ = constant

Now $e_3$, being a linear function of G (unlike $\Delta P$, $e_1$ and $e_2$), may be integrated with respect to $t$:

$$\int_{T_1}^{T_2} e_3 dt = \int_{T_1}^{T_2} (mG+b) dt$$

$$\frac{1}{T_2-T_1}\int_{T_1}^{T_2} e_3 dt = \frac{m}{T_2-T_1}\int_{T_1}^{T_2} G dt + b$$

and the equation may be solved for G average:

$$m\frac{1}{(T_2-T_1)}\left[\int_{T_1}^{T_2} e_3 dt\right] - \frac{b}{m} = \frac{1}{T_2-T_1}\int_{T_1}^{T_2} G dt = G_{average}$$

In Figure 1 a diagrammatic lay-out of the required instrumentalities has been shown. Referring to Figure 1, the reference character 20 designates a flow contact unit. Such a flow contact unit may be a mechanical unit responding to pressure. This flow contact should preferably be responsive to the instantaneous flow. Since in the knowledge of applicant there are no such devices which have an output directly proportional to the instantaneous flow rate, these devices may be referred to as non-linear means.

This flow contact unit 20 is used in association with an auxiliary element 22, which may be of various types of elements for transmitting impulses to the succeeding equipment. If, our example, an electrical circuit is used, this auxiliary element may consist of a condenser, which will appear more fully later. The auxiliary element is used in association with an inverse function element 24. This inverse function element is required in order that the linear relationship may be established between the instantaneous fluid flow and the influence which is to drive the indicator.

Thus far instantaneous values have been found. In the cases where the pulsations in the fluid flow are too erratic or too rapid, instantaneous indications would be useless, and it is desirable to have an instrument which will indicate an average flow rate. In practice the length of the period over which the instantaneous flow rates are to be averaged will depend upon the particular application. This may be accomplished in a physical device by an integrator 26. This integrator is inserted between the inverse function element and the indicator 28. In general, this device should integrate over periods of such length that short time variations in the flow which are not of interest to the observer are eliminated. Instead, an average rate of flow would be indicated.

The calibrated indicator 28 is illustrative of many types of indicators which may be used and calibrated to read average flow rate directly. It should be noted that the same principles may be applied if a cumulative type of meter to show total quantity of fluid passed is desired in preference to a rate of flow meter. Thus far the primary elements have been illustrated.

The flow contact unit 20 may include a nonconducting shell 50 substantially tear-drop in shape. This shell 50 is provided with a slot or opening 52 functioning in a manner similar to a Pitot tube and overlying a movably mounted or yieldable diaphragm 54 arranged in spaced relation from a condenser plate 56. The diaphragm 54 and the condenser plate 53 may cooperate to form the condenser. A cavity 58 is located in the shell 50 and is provided with vents 60 and 62 arranged in such a manner as to expose the cavity 58 to the static pressure of the fluid stream but not to the impact pressure.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

Having thus described my invention, I claim:

1. A contact device for use in registering fluid currents, said contact device including a substantially tear-shaped body, a slot extending inwardly from the large end of the body directed in the direction of the approaching fluid currents, a metallic diaphragm resiliently mounted in one side wall of the slot, a metallic plate mounted in spaced relation from said diaphragm, said diaphragm and said plate cooperating to form an electrical condenser, and air passages surrounding the plate and vented through the sides of the body through vent openings arranged substantially normal to the direction of the approaching fluid.

2. A contact device for measuring pulsating fluid currents, said contact device including a substantially tear-shaped body portion having a slotted opening in the large end thereof, which opening is directed in the direction of the approaching fluid currents, electrical impedance means responding to variations in the fluid pressures in the slot, said impedance means including a flexibly mounted diaphragm mounted in the side of the slot and extending in a direction substantially parallel to the direction of the fluid currents, a cavity in the body on the side of the diaphragm opposite the slot, said cavity having openings extending through the walls of the body in a direction substantially normal to the direction of flow of the fluid currents.

WILLIAM H. HAGENBUCH.

REFERENCES CITED

The following references are of record in the file of this patent:

UNITED STATES PATENTS

| Number | Name | Date |
| --- | --- | --- |
| 1,935,445 | Heinz | Nov. 14, 1933 |
| 2,098,574 | Doyle | Nov. 9, 1937 |
| 2,103,741 | Bencowitz | Dec. 28, 1937 |
| 2,178,422 | Heagney | Oct. 31, 1939 |
| 2,217,539 | De Bruin | Oct. 8, 1940 |
| 2,315,756 | Warner | Apr. 6, 1943 |
| 2,367,866 | Humphreys et al. | Jan. 23, 1945 |
| 2,428,234 | Mapp | Sept. 30, 1947 |